(12) United States Patent  
Yoshimi et al.

(10) Patent No.: US 11,300,681 B2  
(45) Date of Patent: Apr. 12, 2022

(54) WEATHER RADAR APPARATUS AND SEVERE RAIN PREDICTION METHOD

(71) Applicants: KABUSHIKI KAISHA TOSHIBA, Minato-ku (JP); Toshiba Infrastructure Systems & Solutions Corporation, Kawasaki (JP)

(72) Inventors: Kazuhiro Yoshimi, Kawasaki (JP); Fumihiko Mizutani, Yokohama (JP)

(73) Assignees: KABUSHIKI KAISHA TOSHIBA, Minato-ku (JP); Toshiba Infrastructure Systems & Solutions Corporation, Kawasaki (JP)

(*) Notice: Subject to any disclaimer, the term of this patent is extended or adjusted under 35 U.S.C. 154(b) by 0 days.

(21) Appl. No.: 16/812,527

(22) Filed: Mar. 9, 2020

(65) Prior Publication Data

US 2020/0209386 A1  Jul. 2, 2020

Related U.S. Application Data

(63) Continuation of application No. PCT/JP2018/034037, filed on Sep. 13, 2018.

(30) Foreign Application Priority Data

Mar. 5, 2018 (JP) .............................. JP2018-039062

(51) Int. Cl.
 *G01S 13/95* (2006.01)
 *G01S 7/41* (2006.01)
(52) U.S. Cl.
 CPC ............ *G01S 13/958* (2013.01); *G01S 7/412* (2013.01)
(58) Field of Classification Search
 CPC ...... G01S 13/958; G01S 7/412; G01S 13/726; G01S 13/95; G01S 13/951;
 (Continued)

(56) References Cited

U.S. PATENT DOCUMENTS 6,128,578 A    10/2000  Sakaino et al.
2003/0025627 A1  2/2003  Wilson et al.
(Continued)

FOREIGN PATENT DOCUMENTS

JP    10-227871 A    8/1998
JP    10-288674 A    10/1998
(Continued)

OTHER PUBLICATIONS

International Search Report dated Nov. 27, 2018 in PCT/JP2018/034037 filed Sep. 13, 2018, 2 pages.
(Continued)

*Primary Examiner* — Timothy A Brainard
(74) *Attorney, Agent, or Firm* — Oblon, McClelland, Maier & Neustadt, L.L.P.

(57) ABSTRACT

According to one embodiment, there is provided a weather radar apparatus including means for generating observation data related to a weather phenomenon by processing a radar signal received by an antenna, and information processing means for processing the observation data. The information processing means includes means for executing recognition processing to recognize a rain area which arises as the weather phenomenon, based on the observation data, means for generating threat information for calculating a degree of threat of severe rain to a target point, based on a recognition result of the recognition processing, and means for specifying a predetermined function for calculating the degree of threat, applying the threat information as a parameter to the function, and calculating the degree of threat.

6 Claims, 7 Drawing Sheets

(58) Field of Classification Search
CPC .. G01S 2013/0245; G01S 7/003; G01S 7/411; G01W 1/10; Y02A 90/10
See application file for complete search history.

(56) References Cited

U.S. PATENT DOCUMENTS

| | | | |
|---|---|---|---|
| 2006/0267783 A1 | 11/2006 | Smith | |
| 2010/0245165 A1* | 9/2010 | Kauffman | G01S 13/953 342/26 B |
| 2015/0302622 A1* | 10/2015 | Takechi | G01C 21/20 345/629 |

FOREIGN PATENT DOCUMENTS

| | | |
|---|---|---|
| JP | 2000-187082 A | 7/2000 |
| JP | 2001-289961 A | 10/2001 |
| JP | 2002-107462 A | 4/2002 |
| JP | 2005-106601 A | 4/2005 |
| JP | 2006-252128 A | 9/2006 |
| JP | 2010-286458 A | 12/2010 |
| JP | 2015-99034 A | 5/2015 |
| JP | 5973124 B2 | 8/2016 |
| JP | 2017-3416 A | 1/2017 |
| JP | 2017-134062 A | 8/2017 |
| KR | 10-1755521 B1 | 7/2017 |
| TW | 201730584 A | 9/2017 |

OTHER PUBLICATIONS

Taiwanese Office Action dated Sep. 1, 2017 in Taiwanese Patent Application No. 201730582 A (with English translation), 93 pages.
English translation of the International Preliminary Report on Patentability dated Sep. 10, 2020 in PCT/JP2018/034037 filed Sep. 13, 2018, 6 pages.
Supplementary European Search report dated Nov. 3, 2021, issued in corresponding EP application No. EP 18 90 8345, (12 pages).
Petr Rapant, "Early Warning of Flash Floods Based on the Weather Radar", 2015 IEEE, 16$^{th}$ International Carpathian Control Conference, pp. 426-430.
D. Krezeski, et al., "Storm Tracking in Doppler Radar Images", 1994 *IEEE*, pp. 226-230.

* cited by examiner

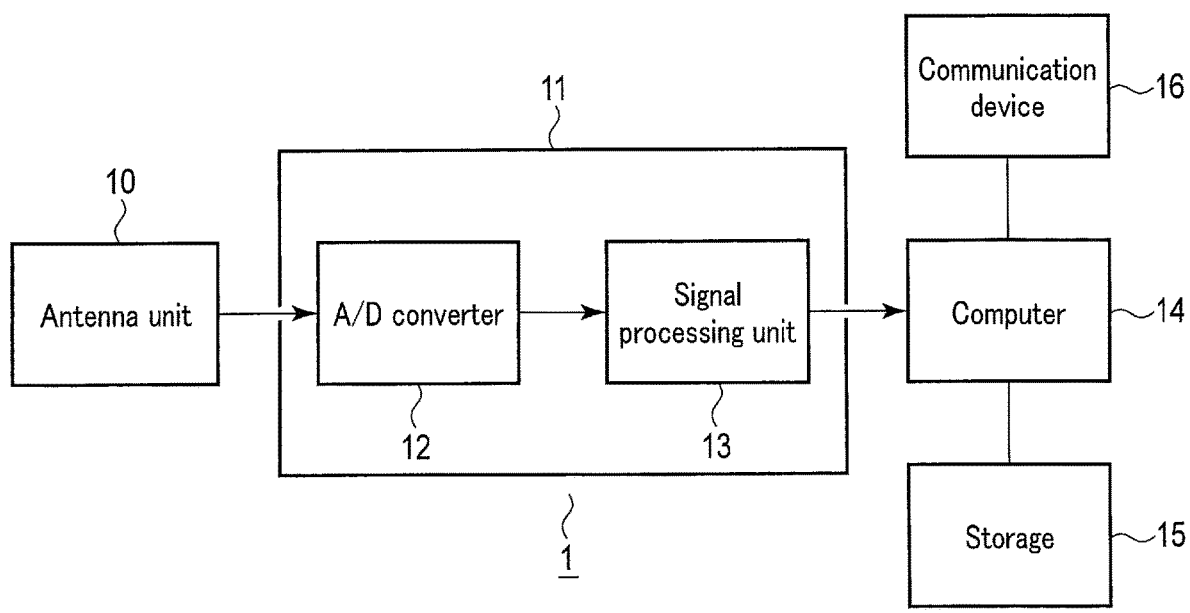
F I G. 1

WEATHER RADAR APPARATUS AND SEVERE RAIN PREDICTION METHOD

CROSS-REFERENCE TO RELATED APPLICATIONS

This application is a Continuation Application of PCT Application No. PCT/JP2018/034037, filed Sep. 13, 2018 and based upon and claiming the benefit of priority from Japanese Patent Application No. 2018-039062, filed Mar. 5, 2018, the entire contents of all of which are incorporated herein by reference.

FIELD

Embodiments described herein relate generally to a weather radar apparatus capable of implementing a severe rain prediction function and a severe rain prediction method.

BACKGROUND

In recent years, local severe rain known as "guerrilla rainstorms," which are a sudden and specific weather phenomenon, have frequently occurred. In order to minimize the disaster resulting from such severe rain, it is increasingly necessary to estimate a degree of threat due to the severe rain by performing severe rain prediction to predict and analyze occurrences of severe rain. To implement such a function, a severe rain prediction system using a high-resolution weather radar, etc. is proposed.

The conventional severe rain prediction system has a configuration to perform processing of referring to previous cases similar to the current rain area, thereby predicting and analyzing occurrences of severe rain so as to determine a degree of hazard based on the prediction result. Since such a severe rain prediction system depends on the previous cases, it is difficult for the system to accurately and rapidly predict and analyze severe rain that is a specific and local weather phenomenon. It is also difficult to determine an effective degree of hazard based on the prediction result so as to minimize the disaster resulting from severe rain.

Accordingly, the objective is to provide a weather radar apparatus capable of accurately and rapidly predicting and analyzing severe rain which is a specific and local weather phenomenon, and estimating an effective degree of threat based on the prediction result.

BRIEF DESCRIPTION OF THE DRAWINGS

FIG. 1 is a block diagram explaining a configuration of a weather radar apparatus according to an embodiment.

DETAILED DESCRIPTION

Figure 2:
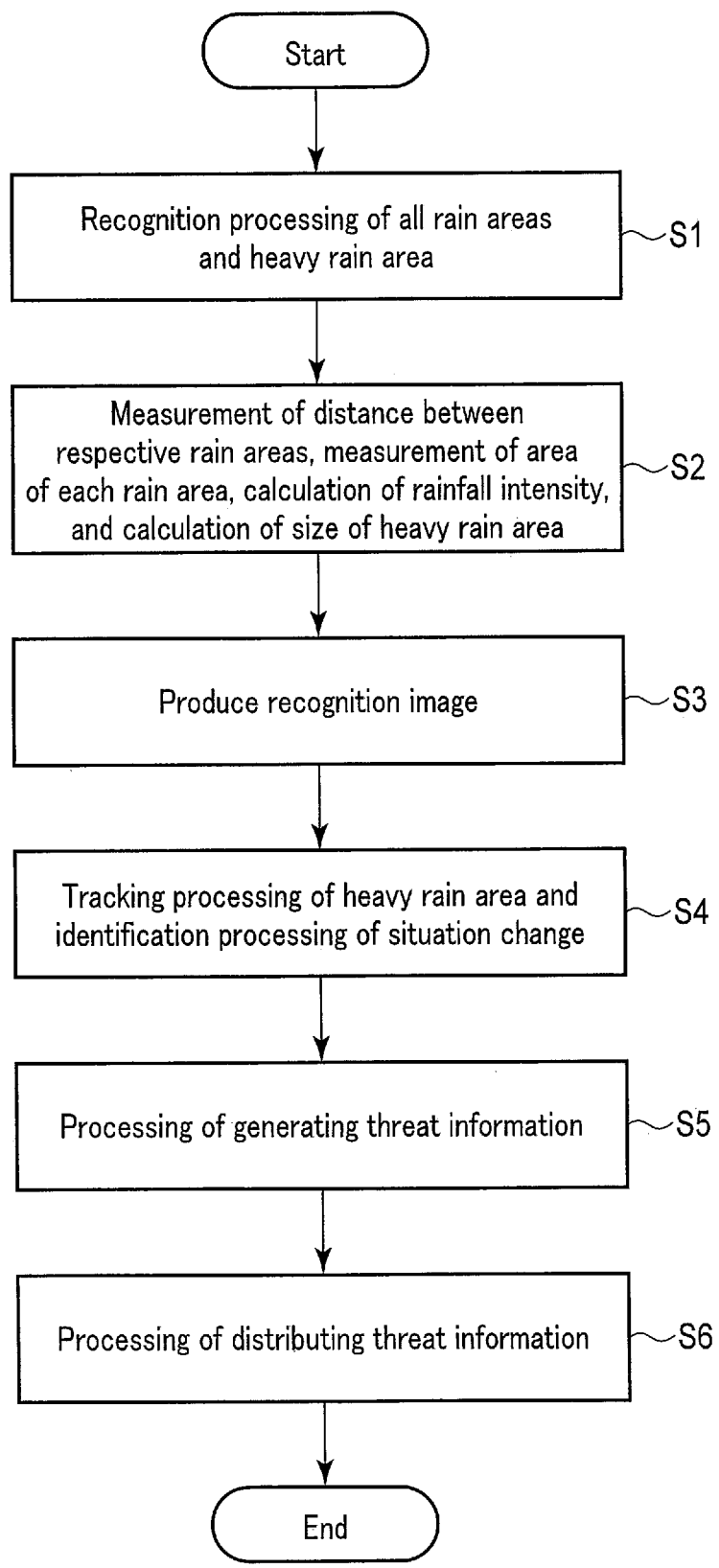
FIG. 2 is a flow chart explaining operation of the weather radar apparatus according to the embodiment.

Hereinafter, an embodiment will be described with reference to the drawings.

According to an embodiment, a weather radar apparatus includes means for generating observation data related to a weather phenomenon by processing a radar signal received by an antenna, and information processing means for processing the observation data. The information processing means includes means for executing recognition processing to recognize a rain area which arises as the weather phenomenon, based on the observation data, means for generating threat information for calculating a degree of threat of severe rain to a target point, based on a recognition result of the recognition processing, means for specifying a predetermined function for calculating the degree of threat, applying the threat information as a parameter to the function, and calculating the degree of threat, and means for calculating, as the threat information, a distance from a rain area of the severe rain to the target point, indexed data indicating a state of the rain area approaching the target point, data indicating a size of the rain area, and a growth-and-decay state of the rain area.

[Configuration of Weather Radar Apparatus]

FIG. 1 is a block diagram explaining a configuration of a weather radar apparatus 1 according to the present embodiment. In a configuration of a weather radar apparatus 1 of the present embodiment, a high-resolution weather radar such as a phased-array weather radar, or a weather radar with an XRAIN (eXtended RAdar Information Network) system is applied.

As shown in FIG. 1, the weather radar apparatus 1 has an antenna unit 10, a radar signal processing device 11, a computer 14, a storage 15, and a communication device 16. The antenna unit 10 includes a phased array antenna, for example, receives reflected waves of transmitted electric waves, and transmits the reflected waves to the radar signal processing device 11.

The radar signal processing device 11 includes an A/D converter 12 and a signal processing unit 13. The A/D converter 12 converts analog signals, which are reflected waves received by the antenna unit 10, into digital signals. The signal processing unit 13 executes various digital signal processing such as processing of removing ground clutter, and outputs digital data after the signal processing to the computer 14.

The computer 14 inputs the digital data from the signal processing unit 13 and performs data processing and analysis processing related to the severe rain prediction processing of the present embodiment, by using software stored in the storage 15. As will be described, the severe rain prediction processing of the present embodiment includes processing of generating threat information for calculating (estimating) a degree of threat to a target point. The storage 15 stores data and information necessary for data processing and analysis processing, in addition to the software executed by the computer 14. The communication device 16 is connected to the network and controlled by the computer 14 so as to distribute data and information output by the data processing and the analysis processing to a server, etc. of a weather center, for example.

[Severe Rain Prediction Processing]

Figure 3:
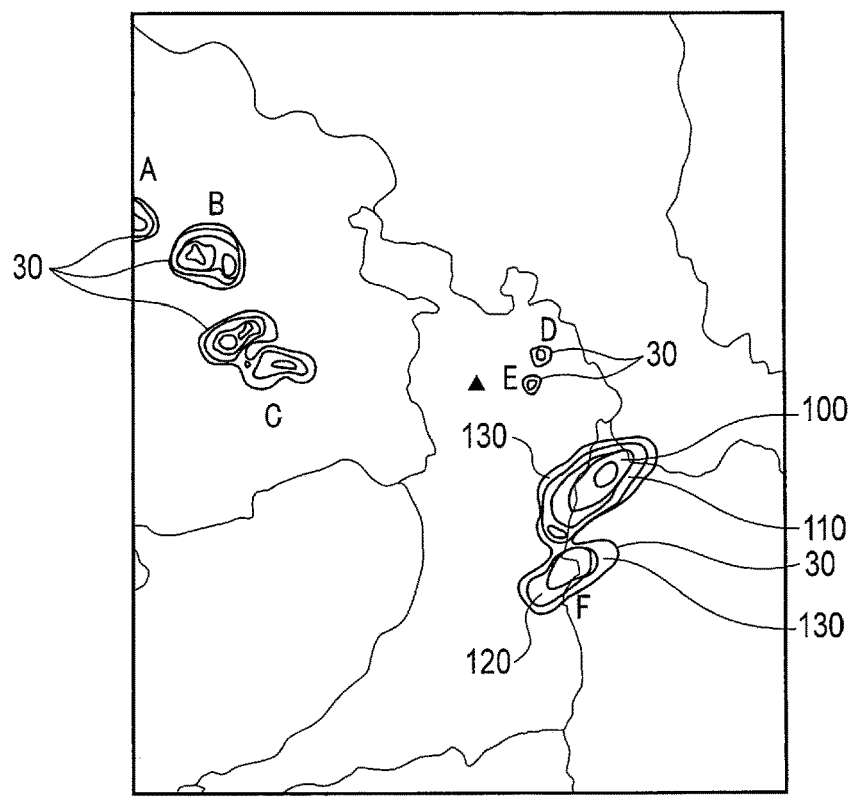
FIG. 3 is a diagram showing an example of a recognition image of all rain areas according to the embodiment.
Figure 4:
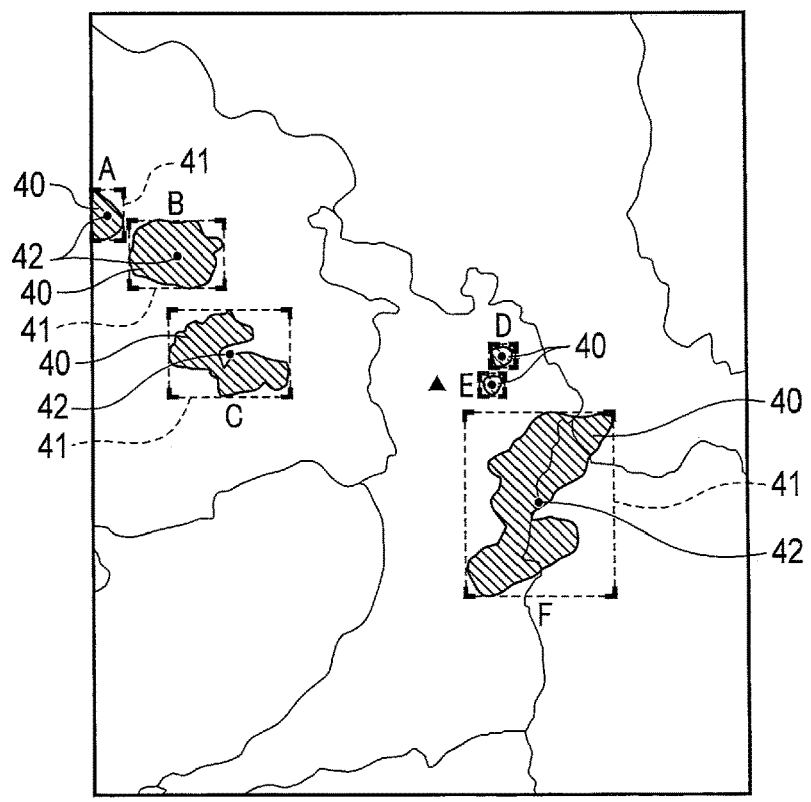
FIG. 4 is a diagram showing an example of a binarized image of all the rain areas according to the embodiment.

FIG. 2 is a flowchart showing the processing executed by the computer 14. FIG. 3 is a diagram showing an example of a recognition image produced by the computer 14. FIG. 4 is a diagram showing a binarized image.

As shown in FIG. 2, the computer 14 executes recognition processing of all rain areas and a heavy rain area by using digital data from the signal processing unit 13 (S1). Specifically, the computer 14 produces observation data including rainfall intensity data based on the digital data (data including reception intensity). The computer 14 produces an observation image t0 indicating a rain area based on the observation data. The observation image t0 is based on the observation data at time t0. To the produced observation image, the computer 14 performs recognition processing of all rain areas and the heavy rain area including binarization processing, extracting processing of a circumscribed rectangle (circumcircle), extracting processing of coordinate point information, and labeling processing.

Next, the computer 14 executes processing such as distance measurement to measure a distance between respective rain areas 30, area measurement to measure an area of each rain area 30, calculation of an average rainfall intensity of each rain area 30, and calculation of an indexed size of each rain area 30 (S2). The computer 14 stores the measurement results and calculation results in the storage 15.

The computer 14 executes the above processing (S1, S2) at intervals of $\Delta t$ (e.g., two minutes) from time t0 to to so as to produce recognition images of all rain areas and the heavy rain area from the results of recognition processing (S3). FIG. 3 shows an example of a recognition image indicating all rain areas 30 obtained through the recognition processing of the computer 14. As shown in FIG. 3, all rain areas 30 are labeled A to F by labeling processing on the map produced through the extracting processing of coordinate point (longitude and latitude) information.

Herein, for descriptive purposes, levels of the rainfall intensity in each of all rain areas 30 in the recognition image are distinguished from each other by areas on the basis of the rainfall intensity data; however, it is also possible to distinguish the levels using colors for display. For example, in the rain area 30 labeled F, a portion 100 with a maximum rainfall intensity is displayed in orange, a portion 110 with an intermediate rainfall intensity is displayed in yellow, a portion 120 with a relatively small rainfall intensity is displayed in blue, and a portion 130 with a minimum rainfall intensity is displayed in green.

FIG. 4 shows an example of a recognition image indicating all rain areas 40 to which the binarization processing and the extracting processing of a circumscribed rectangle (circumcircle) are performed. As shown in FIG. 4, each of all rain areas 40 that are binarized can be extracted for each of the labels A to F by extracting processing of a circumscribed rectangle 41. The computer 14 can store a recognition image extracted for each of the labels A to F in the storage 15 along with the coordinate point information including a centroid 42.

Figure 5:
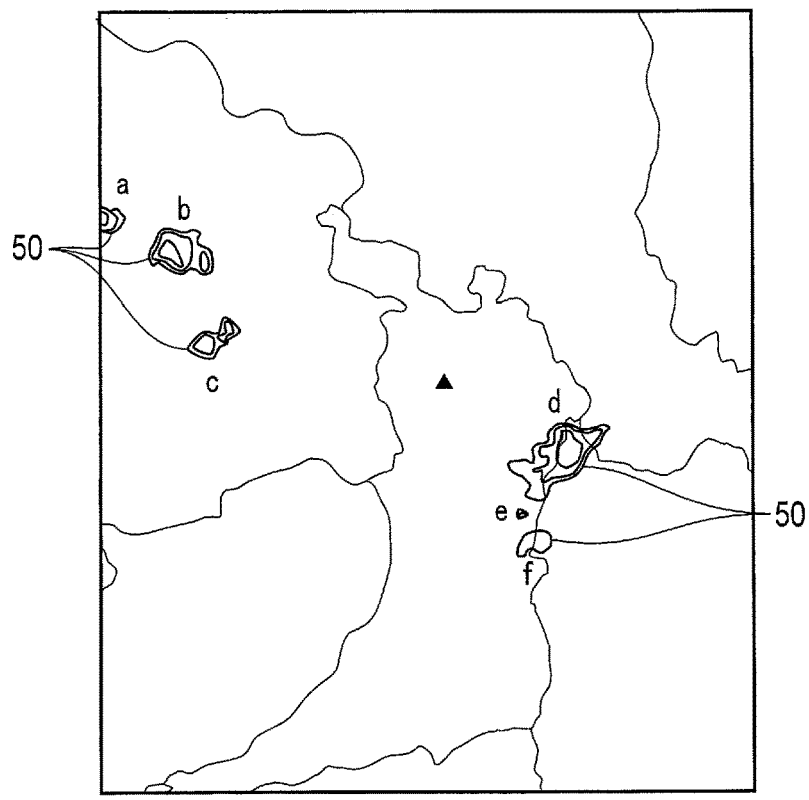
FIG. 5 is a diagram showing an example of a recognition image of a heavy rain area according to the embodiment.

FIG. 5 shows an example of a recognition image indicating heavy rain areas 50. As shown in FIG. 5, the heavy rain areas 50 are labeled a to f by labeling processing on the map produced by the extracting processing of coordinate point (longitude and latitude) information.

Figure 6:
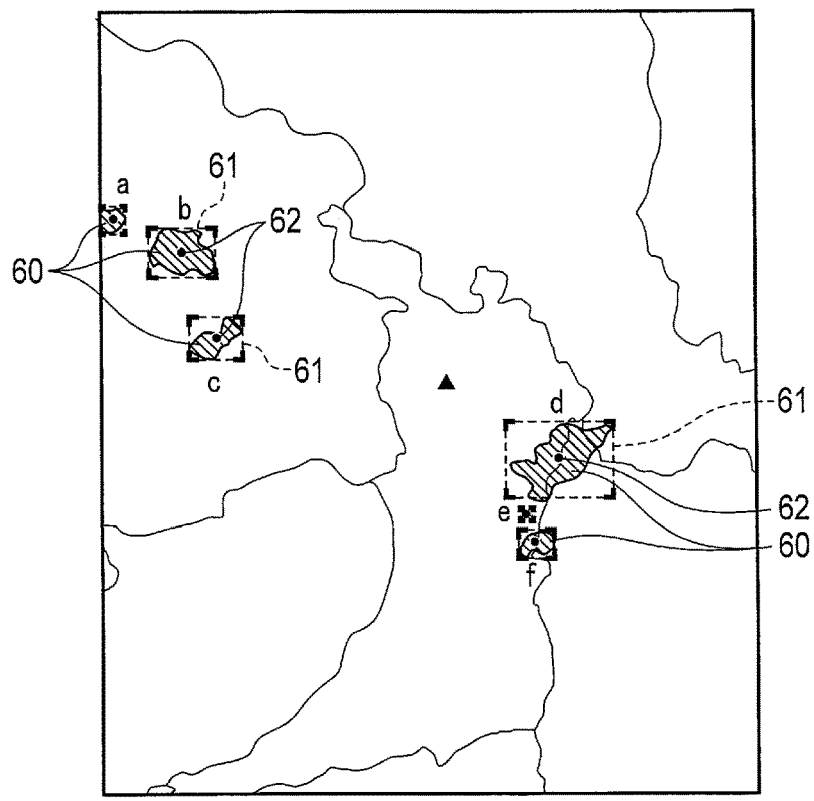
FIG. 6 is a diagram showing an example of a binarized image of the heavy rain area according to the embodiment.

FIG. 6 shows an example of a recognition image indicating heavy rain areas 60 to which the binarization processing and the extracting processing of a circumscribed rectangle (circumcircle) are performed. As shown in FIG. 6, each of the binarized heavy rain areas 60 can be extracted for each of the labels a to f by extracting processing of a circumscribed rectangle 61. The computer 14 can store a recognition image extracted for each of the labels a to f in the storage 15 along with the coordinate point information including the centroid 62.

The computer 14 can distribute the recognition images 30, 40, 50, and 60 of all rain areas and heavy rain areas stored in the storage 15 from the communication device 16 to a server, etc. of a weather center via the network. Thereby, the server can display each recognition image on a screen of a display device.

Next, the computer 14 executes tracking processing of the heavy rain areas and identification processing of a situation change by using the recognition images produced through the recognition processing executed at intervals of a time period $\Delta t$ (S4). Specifically, the computer 14 executes segmentation processing, matching processing of positions, coordinate evaluation processing, abnormal value determination processing of a displacement amount (determination processing of an error image), tracking processing, identification processing of a situation change, and re-labeling processing. In other words, the computer 14 separates a recognition image as a processing target from each of the recognition images 50 and 60 of heavy rain areas by segmentation processing. The computer 14 identifies temporal transition of the image as a processing target by the matching processing of positions and the coordinate evaluation processing. Moreover, the computer 14 identifies a situation change of the heavy rain area as a processing target by the tracking processing of the recognition image as a processing target and identification processing of a situation change.

Figure 7:
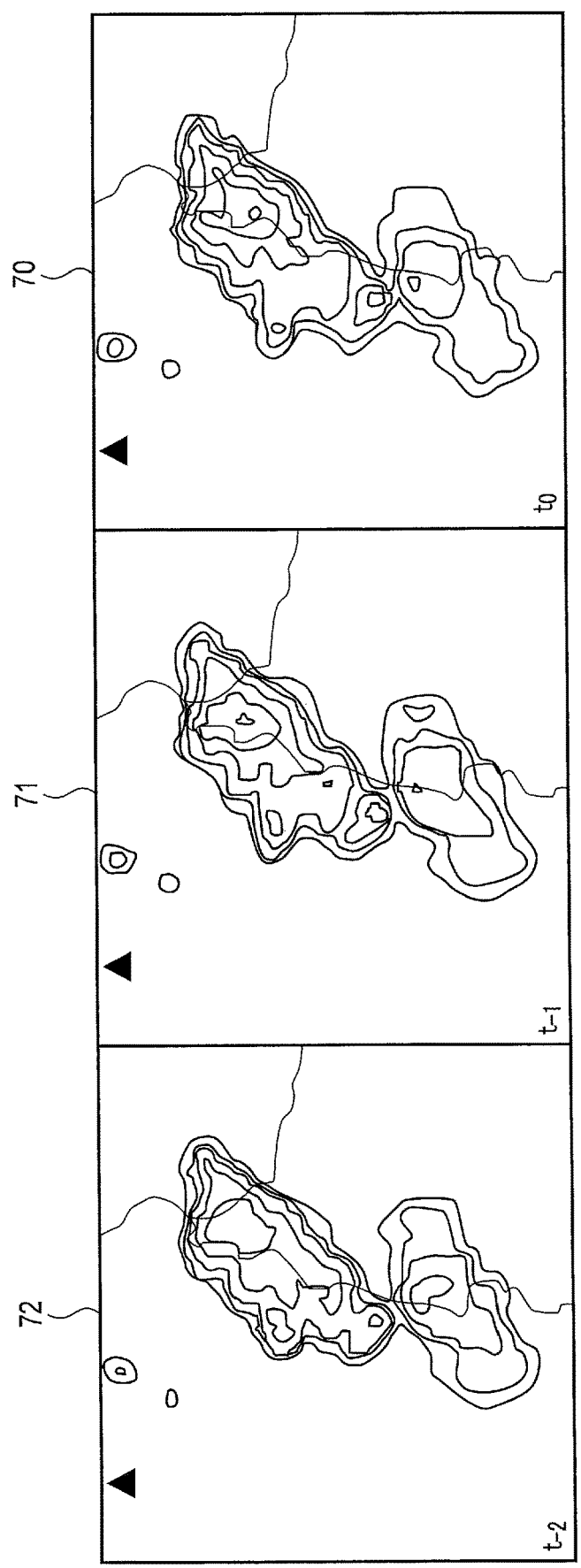
FIG. 7 is a diagram showing an example of a recognition image indicating temporal variation of the heavy rain area according to the embodiment.
Figure 8:
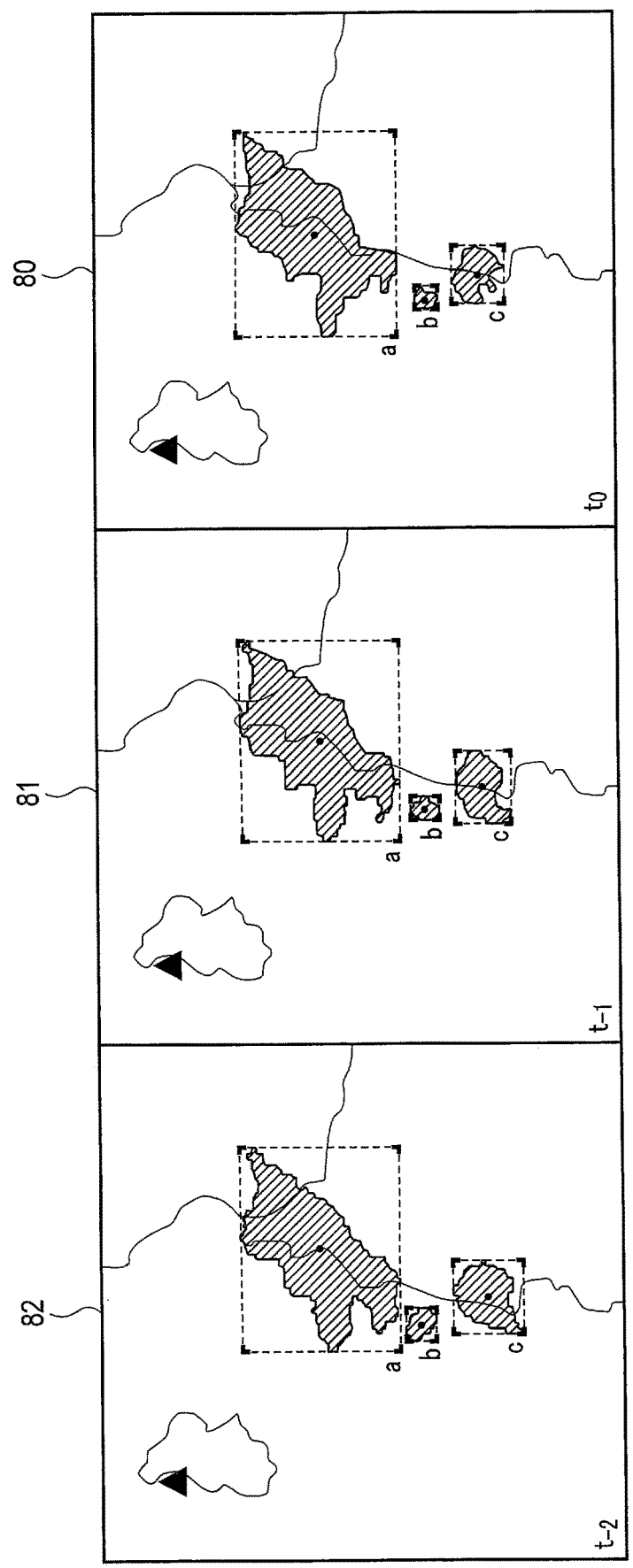
FIG. 8 is a diagram showing an example of a binarized image indicating temporal variation of the heavy rain area according to the embodiment.
Figure 9:
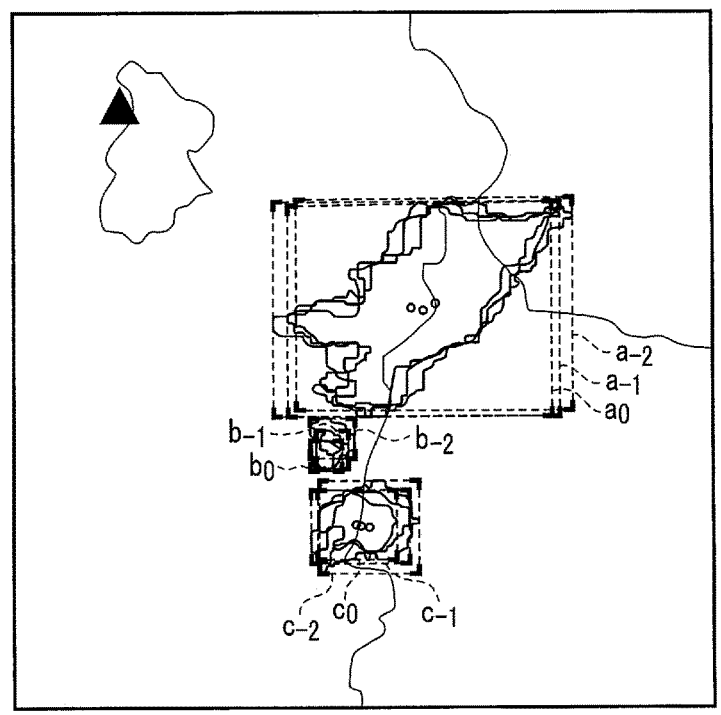
FIG. 9 is a diagram in which images of the heavy rain area indicating temporal variation are superimposed according to the embodiment.

FIGS. 7 to 9 are diagrams respectively showing processing results obtained by the tracking processing of the heavy rain area and the identification processing of a situation change. FIG. 7 indicates recognition images 70, 71, and 72 indicating temporal variation at time t0, t-1, and t-2 in the heavy rain area labeled as d shown in FIG. 5, for example. FIG. 8 shows recognition images 80, 81, and 82 indicating temporal variation at time t0, t-1, and t-2 in the heavy rain areas to which the binarization processing and the extracting processing of a circumscribed rectangle (circumcircle) are performed.

As the identification processing of a situation change, the computer 14 extracts information on a situation change of the heavy rain areas by executing comparative processing of a recognition image at time t0 and an earlier recognition image processed time $\Delta t$ (a recognition image at time t-1), for example. FIG. 9 shows a diagram in which images of the heavy rain area indicating temporal variation through time t0, t-1, and t-2 in each frame are superimposed, which is information on a situation change of the heavy rain area.

Referring back to FIG. 2, the computer 14 executes the processing of generating threat information (S5) by using results of the above processing: the recognition processing of rain areas and heavy rain areas (S1); measurement processing and calculation processing regarding the rain areas (S2); processing of producing recognition images of the rain areas and heavy rain areas (S3); and identification processing of a situation change of the rain areas (S4). Hereinafter, the threat information and generating processing will be described with reference to FIG. 10.

The threat information in the present embodiment is information for calculating (estimating) a degree of threat (degree of hazard) to a target point caused by severe rain. The degree of threat may be defined as an evaluation value which can be calculated by an evaluation function f (a·D, b·A, c·Sc, d·GD). Herein, a, b, c, and d indicate weight coefficients. The threat information corresponds to parameters D, A, Sc, and GD of the evaluation function f, for example.

Figure 10:
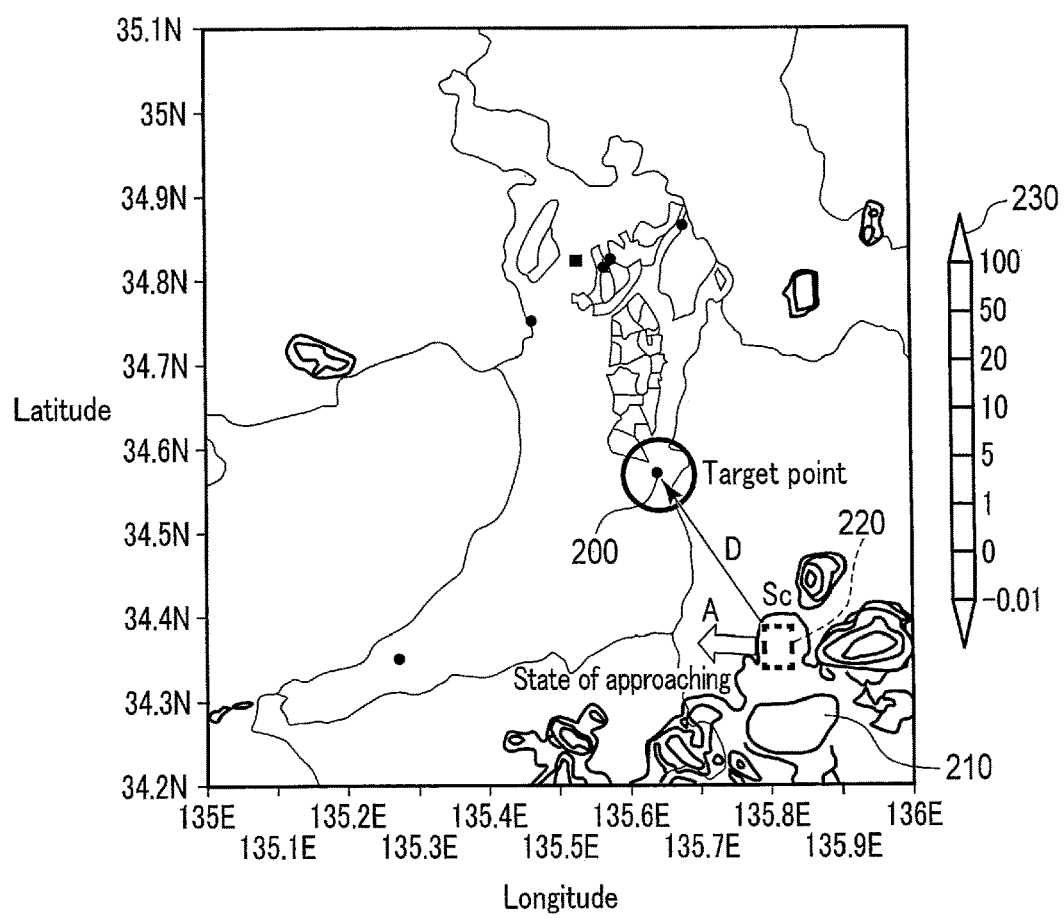
FIG. 10 is a diagram for explaining threat information according to the embodiment.

FIG. 10 is a diagram for explaining threat information D, A, Sc, and GD. As shown in FIG. 10, the parameter D (distance) indicates a distance (meters) to a target point 200 specified by a longitude and a latitude from the centroid of a circumscribed rectangle 220 of a heavy rain area with rainfall intensity equal to or larger than 50 mm/h in a rain area 210. Herein, for descriptive purposes, the rainfall intensities in the rain area 210 are distinguished from each other by area, as shown in FIG. 3. Rainfall intensities may be distinguished from each other by color for display by an indicator 230.

The parameter A (access) indicates a state of approaching the target point. Specifically, in accordance with the difference of the distance D between time t and t−Δt, if a condition of "D(t)−D(t−Δt)<0" is satisfied, the parameter is indexed as "approaching (+1)." If a condition of "D(t)−D(t−Δt)=0" is satisfied, the parameter is indexed as "stationary (±0)." If a condition of "D(t)−D(t−Δt)>0" is satisfied, the parameter is indexed as "leaving (−1)." Alternatively, for example, approximation can be specified when a cumulative value, etc. over ten minutes exceeds a certain threshold value.

The parameter Sc (scale) indicates a size of the rain area, and is defined by a number of pixels of the recognition image. The parameter GD (growth and decay) indicates a growth-and-decay state of the rain area, and may be defined as a difference in number of pixels of the heavy rain area at time t and time t−Δt, for example.

The computer 14 specifies a degree of threat as an evaluation value which can be calculated by the evaluation function f, and generates parameters D, A, Sc, and GD of the evaluation function f as threat information. The computer 14 calculates (estimates) a degree of threat (degree of hazard) to the target point caused by severe rain by applying the generated threat information to the evaluation function f. The computer 14 stores, in the storage 15, the generated threat information and the degree of threat (degree of hazard) calculated (estimated) by applying the threat information to the evaluation function f.

Moreover, the computer 14 distributes the threat information and the degree of threat (degree of hazard) stored in the storage 15 from the communication device 16 to a server, etc. of a weather center, for example, via the network (S6). Thereby, the server can display the threat information and the degree of threat on the screen of the display device.

In the present embodiment, the degree of threat (degree of hazard) may be calculated (estimated) by causing the computer 14 to execute processing to distribute the threat information to the server of the weather center, and applying the threat information to the evaluation function f at the server. In the present embodiment, a case where a degree of threat caused by severe rain is calculated for one target point 200 is explained; however, the configuration is not limited thereto, and it is possible to calculate a degree of threat caused by severe rain for a plurality of target points.

As described above, according to the present embodiment, the computer 14 executes software (algorithm) shown in FIG. 2, thereby processing the weather radar data, generating a recognition image of a rain area, calculating an area, rainfall intensity, and a size of the rain area, and extracting information on a situation change of the rain area. In this case, it is possible to particularly generate a recognition image of a heavy rain area that leads to severe rain, calculate an area, rainfall intensity, and a size of the heavy rain area, and extract information on a situation change of the heavy rain area.

Furthermore, the computer 14 generates threat information for calculating (estimating) a degree of threat (degree of hazard) to a target point caused by severe rain (heavy rainfall). The threat information is information indicating a distance from the heavy rain area to the target point, a state of approaching the target area of the heavy rain area, a size of the heavy rain area, and a growth-and-decay state of the heavy rain area. Since the threat information can be generated according to the present embodiment, it is possible to apply the threat information as a parameter, and define the evaluation function f for calculating the degree of threat (evaluation value).

In the present embodiment, the computer 14 may calculate a degree of threat (evaluation value) for the target point by applying the threat information as a parameter to a preliminarily prepared evaluation function f. Furthermore, if the evaluation function f is preliminarily prepared, the server of the weather center can calculate (estimate) a degree of threat (degree of hazard) by applying the threat information distributed from the computer 14 as a parameter.

In conclusion, according to the present embodiment, it is possible to accurately and rapidly predict and analyze severe rain that is a specific and local weather phenomenon. Since information on the threat on the target point caused by severe rain can be generated, it is possible to calculate (estimate) a degree of threat (degree of hazard) which is effective for minimizing a disaster by using the threat information. Accordingly, the server of the weather center, for example, can identify a degree of threat (degree of hazard) to the target point caused by the severe rain, and thus can realize an effective weather forecast for avoiding a disaster due to severe rain that is a specific and local weather phenomenon.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

The invention claimed is:

1. A weather radar apparatus comprising:
   a memory; and
   a processor connected to the memory and that:
   generates observation data related to a weather phenomenon by processing a radar signal received by an antenna; and
   processes the observation data, the processing observation data including:
   executing recognition processing to recognize a rain area which arises as the weather phenomenon, based on the observation data;
   generating threat information for calculating a degree of threat of severe rain to a target point, based on a result of the recognition processing;
   specifying a predetermined function for calculating the degree of threat, applying the threat information as a parameter to the function, and calculating the degree of threat; and
   calculating, as the threat information, i) a distance from the rain area to the target point,
ii) indexed data indicating a state of the rain area approaching the target point, wherein the state of the rain area approaching the target point includes stationary, approaching to, and leaving from the target point,
iii) data indicating a size of the rain area, and
iv) a growth-and-decay state of the rain area, and
wherein the generating threat information includes executing the recognition processing at intervals of a fixed time period, producing recognition images at respective times, and comparing recognition images to generate the threat information.

2. The weather radar apparatus according to claim 1, wherein the processing observation data further includes:
executing identification processing to identify a situation change of a rain area, based on the result of the recognition process; and
generating the threat information, based on the result of the recognition process and a result of the identification processing.

3. The weather radar apparatus according to claim 2, wherein the processor further distributes the threat information.

4. The weather radar apparatus according to claim 1, wherein the processor further distributes the threat information.

5. A severe rain prediction method to be applied to a weather radar apparatus that includes:
a memory; and
a processor connected to the memory and that:
generates observation data related to a weather phenomenon by processing a radar signal received by an antenna; and
processes the observation data, the processing observation data including:
recognizing a rain area which arises as the weather phenomenon, based on the observation data;
generating threat information for calculating a degree of threat of severe rain to a target point, based on a result of the recognizing the rain area;
specifying a predetermined function for calculating the degree of threat, applying the threat information as a parameter to the function, and calculating the degree of threat; and
calculating, as the threat information,
i) a distance from the rain area to the target point,
ii) indexed data indicating a state of the rain area approaching the target point, wherein the state of the rain area approaching the target point includes stationary, approaching to, and leaving from the target point,
iii) data indicating a size of the rain area, and
iv) a growth-and-decay state of the rain area, and
wherein the generating threat information includes executing the recognizing the rain area at intervals of a fixed time period, producing recognition images at respective times, and comparing recognition images to generate the threat information.

6. The severe rain prediction method according to claim 5, wherein the processing observation data further includes:
identifying a situation change of the rain area, based on the result of the recognition of the rain area; and
generating the threat information, based on the result of the recognition and a result of identifying the situation change.

* * * * *